(12) United States Patent  
van der Griendt et al.

(10) Patent No.: US 6,311,831 B1
(45) Date of Patent: *Nov. 6, 2001

(54) TUBE LOADING SYSTEM (75) Inventors: Pieter S. van der Griendt, Far Hills; Dennis Dutkevitch, Clifton, both of NJ (US)

(73) Assignee: Polytype America Corporation, Mahwah, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,373

(22) Filed: Nov. 30, 1999

Related U.S. Application Data (63) Continuation-in-part of application No. 09/151,458, filed on Sep. 10, 1998.

(51) Int. Cl.$^7$ .................................................. B65G 47/90
(52) U.S. Cl. ............................... 198/487.1; 198/377.08; 198/470.1; 198/471.1
(58) Field of Search ............................... 198/487.1, 689.1, 198/602, 803.12, 377.08, 470.1, 471.1, 457.03

(56) References Cited

U.S. PATENT DOCUMENTS

| | | |
|---|---|---|
| 3,655,026 | 4/1972 | Hirn . |
| 3,760,453 | 9/1973 | Neumann . |
| 4,138,941 * | 2/1979 | McMillin et al. ...................... 101/40 |
| 4,274,532 * | 6/1981 | Johnson ................................ 198/429 |
| 4,388,990 | 6/1983 | Michalik . |
| 4,435,114 | 3/1984 | Fardin . |
| 5,523,101 | 6/1996 | Fitch, Jr. . |
| 5,531,312 * | 7/1996 | Dickey ................................. 198/450 |
| 5,564,334 | 10/1996 | Burke . |
| 5,634,764 * | 6/1997 | Replogle .............................. 414/752 |
| 5,697,606 | 12/1997 | Maass . |
| 5,699,707 | 12/1997 | Campbell, Jr. . |
| 6,161,677 * | 9/1998 | Van Der Griendt .............. 198/487.1 |

* cited by examiner

Primary Examiner—Christopher P. Ellis
Assistant Examiner—Rashmi Sharma
(74) Attorney, Agent, or Firm—Richard M. Goldberg (57) ABSTRACT

A tube loading system includes two flat conveyor belts which are perpendicular to each other for holding a tube having an open end thereagainst with two lines of contact; a motor drive for moving the conveyor belts; a gap between the two lines of contact at meeting edges of the conveyor belts; a vacuum source positioned behind the conveyor belts for supplying a vacuum to the gap so as to pull the tube against both conveyor belts in engagement with the two lines of contact; a pin chain having a plurality of pins spaced therealong for receiving the open ends of the tubes thereon, the pins being positioned adjacent the conveyor belts; and a delivery device for supplying the tubes in sequence to the conveyor belts such that each tube is held in engagement against both conveyor belts with the two lines of contact by the vacuum at the gap, and as the belt moves, each tube is deposited on a respective pin of the pin chain.

17 Claims, 13 Drawing Sheets

TUBE LOADING SYSTEM

REFERENCE TO RELATED APPLICATION

The present application is a continuation-in-part of commonly assigned U.S. patent application Ser. No. 09/151,458, filed Sep. 10, 1998 by Pieter van der Griendt and entitled TUBE LOADING SYSTEM, the entire disclosure of which is incorporated herein by reference.

BACKGROUND OF THE INVENTION

The present invention relates generally to tube loading systems, and more particularly, is directed to a tube loading system that eliminates the need for a pocket wheel.

In order to separately load hollow tubes, for example, empty toothpaste tubes having their bottom ends open, the tubes are provided in stacked or side by side relation on a conveyor. The tubes travel from the conveyor into a chute which conveys and transfers the tubes to a rotatable pocket wheel. The pocket wheel includes a plurality of pockets or recesses along the outer periphery thereof and all tubes that are conveyed through the chute are deposited one at a time into a corresponding pocket during rotation thereof.

A pin chain moves adjacent to the pocket wheel and is provided with a plurality of pins. Each pin is aligned with a pocket. Thus, the tubes are deposited in the pockets and then rotated to a position where one or more air jets blow each tube out of the respective pocket and onto a respective pin. The pins are then moved by the chain to another location downstream thereof. The tubes are then stripped by a stripper wheel from the pins and supplied to another pocket wheel and then onto a mandrel for printing on the tubes.

In order to prevent the tubes from falling out of the pockets before they are transferred to a respective pin, a shield surrounds a portion of the pocket wheel.

However, various problems result with this arrangement. Specifically, a new pocket wheel must be provided each time that the diameter of the tubes substantially changes in order to change the dimensions of the pockets which carry the tubes. Thus, there may be a plurality of pocket wheels for an entire line of tubes. The pocket wheels are relatively large and expensive items.

In addition, because the tubes are not filled and are open at one end, they can be relatively flexible. As a result, they tend to become flattened somewhat. In this regard, a tube may deform and be caught between the end of the chute and another tube already in the receiving pocket, which results in jamming and a consequent shut-down of the machine.

There are many variations of the above arrangement. For example, the pocket wheel can be made of axially sliding individual pockets having a vacuum associated therewith, with the pockets axially sliding to move the tubes onto the pin chain. However, there is a mechanical sliding motion for each pocket, rendering the arrangement very complicated in structure and costly, and also suffering the same disadvantages as discussed above.

Prior copending U.S. patent application Ser. No. 09/151, 458 overcomes many of the disadvantages of the above prior art. In this arrangement, the tubes are held by a vacuum through a single belt having a V-shaped configuration. However, the V-shaped belt is a custom made item, and must be molded specifically for this purpose.

It would therefore be preferable to use flat belts or round belts having a circular cross-section, which are common commercial items, to obtain a two line contact with the tubes. Such flat or round belts are also easy to splice so that particular lengths can easily be formed.

OBJECTS AND SUMMARY OF THE INVENTION

Accordingly, it is an object of the present invention to provide a tube loading system that overcomes the aforementioned problems.

It is another object of the present invention to provide a tube loading system that uses a vacuum and conveyor belt assembly to transport the forwardmost tube from the stack to a pin on a moving pin chain.

It is still another object of the present invention to provide a tube loading system that eliminates the need for a pocket wheel, shield and other interchangeable parts.

It is yet another object of the present invention to provide a tube loading system that is simpler in construction and easier to use than existing systems.

It is a further object of the present invention to provide a tube loading system that is much more reliable than conventional systems.

It is a still further object of the present invention to provide a tube loading system that provides two lines of contact for each tube, with a vacuum therebetween that holds the tubes at the two lines of contact.

It is a yet further object of the present invention to provide a tube loading system that can use conventional flat belts or belts having a circular cross-section.

In accordance with an aspect of the present invention, a tube loading system includes at least one conveyor belt for holding a tube having an open end thereagainst with two lines of contact; a motor drive for moving the at least one conveyor belt; a gap between the two lines of contact; a vacuum source for supplying a vacuum to the gap so as to pull the tube against the at least one conveyor belt in engagement with the two lines of contact; a pin chain having a plurality of pins spaced therealong for receiving the open ends of the tubes thereon, the pins being positioned adjacent the at least one conveyor belt; and a delivery device for supplying the tubes in sequence to the at least one conveyor belt such that each tube is held in engagement against the at least one conveyor belt with the two lines of contact by the vacuum at the gap, and as the belt moves, each tube is deposited on a respective pin of the pin chain.

The at least one conveyor belt includes at least one endless belt wrapped about two pulleys, with said gap extending lengthwise therealong between said two lines of contact. There may be two parallel, spaced apart conveyor belts with the gap therebetween. In one embodiment, the two conveyor belts are oriented at an angle relative to each other, and specifically, are substantially perpendicular to each other, with adjacent edges separated by the gap. In another embodiment, each conveyor belt has a substantially circular cross-sectional configuration. In a further embodiment, each conveyor belt has a substantially trapezoidal cross-sectional configuration.

In another embodiment, there is a single conveyor belt having a substantially V-shaped cross-sectional configuration, with the gap extending lengthwise along the belt at a center of the V-shape.

The motor drive includes a motor for rotating at least one of the pulleys, and preferably, a servo motor that incrementally rotates the at least one pulley.

In one embodiment, the vacuum source includes a vacuum plenum against which the at least one conveyor belt rides, the vacuum plenum including an opening in alignment with the gap for applying the vacuum through the opening to the gap. A vertical adjusting assembly is provided for adjusting a vertical position of the vacuum plenum and thereby a vertical position of the at least one conveyor belt.

In another embodiment, the vacuum source includes a vacuum plenum positioned behind the at least one conveyor belt at the gap, for applying a vacuum to the gap.

The pins extend in a direction substantially parallel to the at least one conveyor belt such that the open ends of the tubes are positioned over the pins. A pin alignment mechanism guides the pins to a position adjacent to and substantially parallel with the at least one conveyor belt. The pin alignment mechanism includes at least one chain guide assembly for guiding the pin chain along a predetermined path. The pin alignment mechanism further includes at least one pin guide assembly for engaging free portions of the pins to provide a predetermined alignment of the pins as the pins pass by the at least one conveyor belt.

The above and other objects, features and advantages of the invention will become readily apparent from the following detailed description thereof which is to be read in connection with the accompanying drawing.

DETAILED DESCRIPTION

Figure 1:
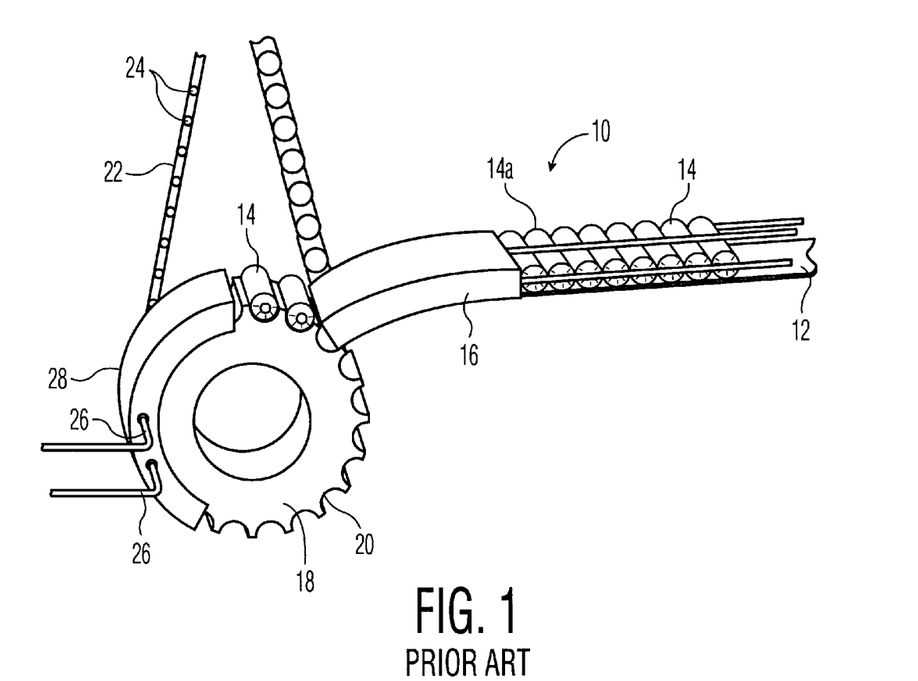
FIG. 1 is a perspective view of a tube loading system according to the prior art.
Figure 2:
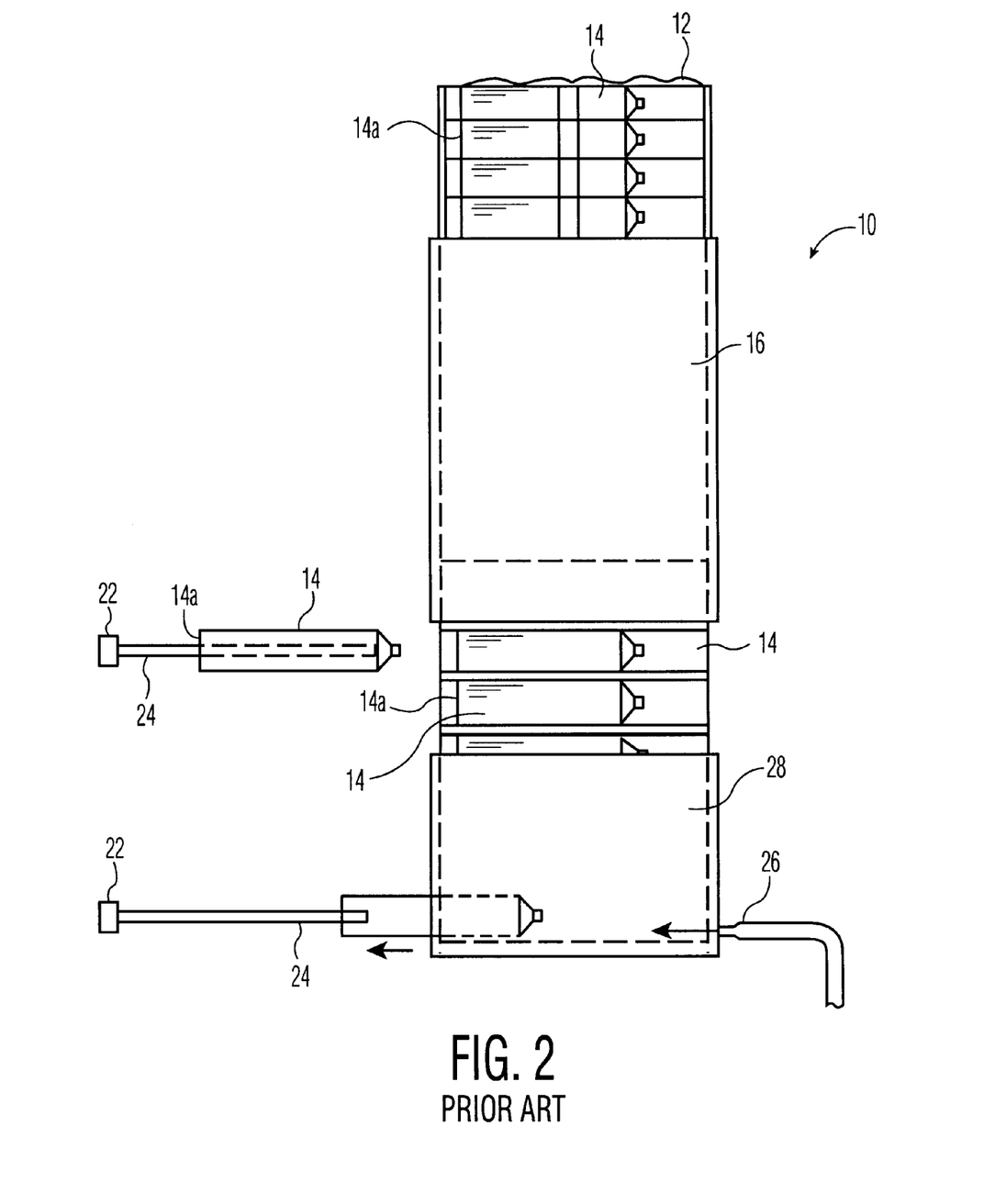
FIG. 2 is a top plan view of the tube loading system of FIG. 1.
Figure 3:
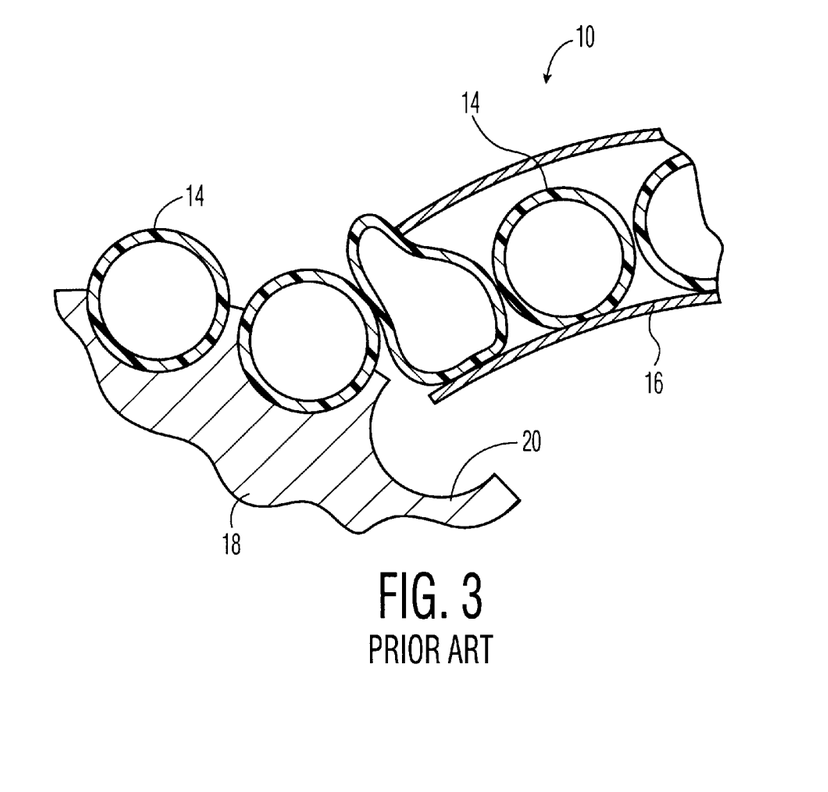
FIG. 3 is an enlarged cross-sectional view of the tube loading system of FIG. 1, showing jamming of the same.

Referring initially to FIGS. 1–3, a tube loading system 10 according to the prior art includes a conveyor 12 on which empty tubes 14 having bottom open ends 14a are stacked, that is, in a side by side relation. Tubes 14 travel from conveyor 12 into a chute 16 which conveys and transfers tubes 14 to a rotatable pocket wheel 18. Chute 16 is often eliminated and replaced by guides. Pocket wheel 18 includes a plurality of pockets or recesses 20 along the outer periphery thereof, and all tubes 14 that are conveyed through chute 16 are deposited one at a time into a corresponding pocket 20 during rotation thereof.

A pin chain 22 moves adjacent to pocket wheel 18 and is provided with a plurality of pins 24 spaced evenly thereal-ong and extending therefrom toward respective pockets 20 of pocket wheel 18. Thus, tubes 14 are deposited in pockets 20 and then rotated to a position where one or more air jets 26 blow each tube 14 out of the respective pocket 20 and onto a respective pin 24. Pins 24 are then moved by chain 22 to another location downstream thereof, wherein tubes 14 are then stripped by a stripper wheel (not shown) from pins 24 and supplied to another pocket wheel (not shown) and then onto a mandrel (not shown) for printing on tubes 14.

In order to prevent tubes 14 from falling out of pockets 20 before they are transferred to a respective pin 24, a shield 28 surrounds a portion of pocket wheel 18. Air jets 26 are provided through shield 28.

However, various problems result with this arrangement. Specifically, a new pocket wheel 18 must be provided each time that the diameter of tubes 14 substantially changes in order to change the dimensions of pockets 20 which carry tubes 14. Thus, there may be a plurality of pocket wheels 18 for an entire line of tubes 14. Pocket wheels 18 are relatively large and expensive items.

In addition, because tubes 14 are not filled and are open at one end, they can be relatively flexible. As a result, they tend to become flattened somewhat. In this regard, as shown in FIG. 3, a tube 14 may deform and be caught between the end of chute 16 and another tube 14 already in a receiving pocket 20, which results in jamming and a consequent shut-down of the machine.

Prior copending U.S. patent application Ser. No. 09/151, 458 overcomes many of the disadvantages of the above prior art. In this arrangement, the tubes are held by a vacuum through a single belt having a V-shaped configuration. However, the V-shaped belt is a custom made item, and must be molded specifically for this purpose.

It would therefore be preferable to use flat belts or round belts having a circular cross-section, which are common commercial items, to obtain a two line contact with the tubes. Such flat or round belts are also easy to splice so that particular lengths can easily be formed.

The present invention overcomes the above problems.

Figure 4:
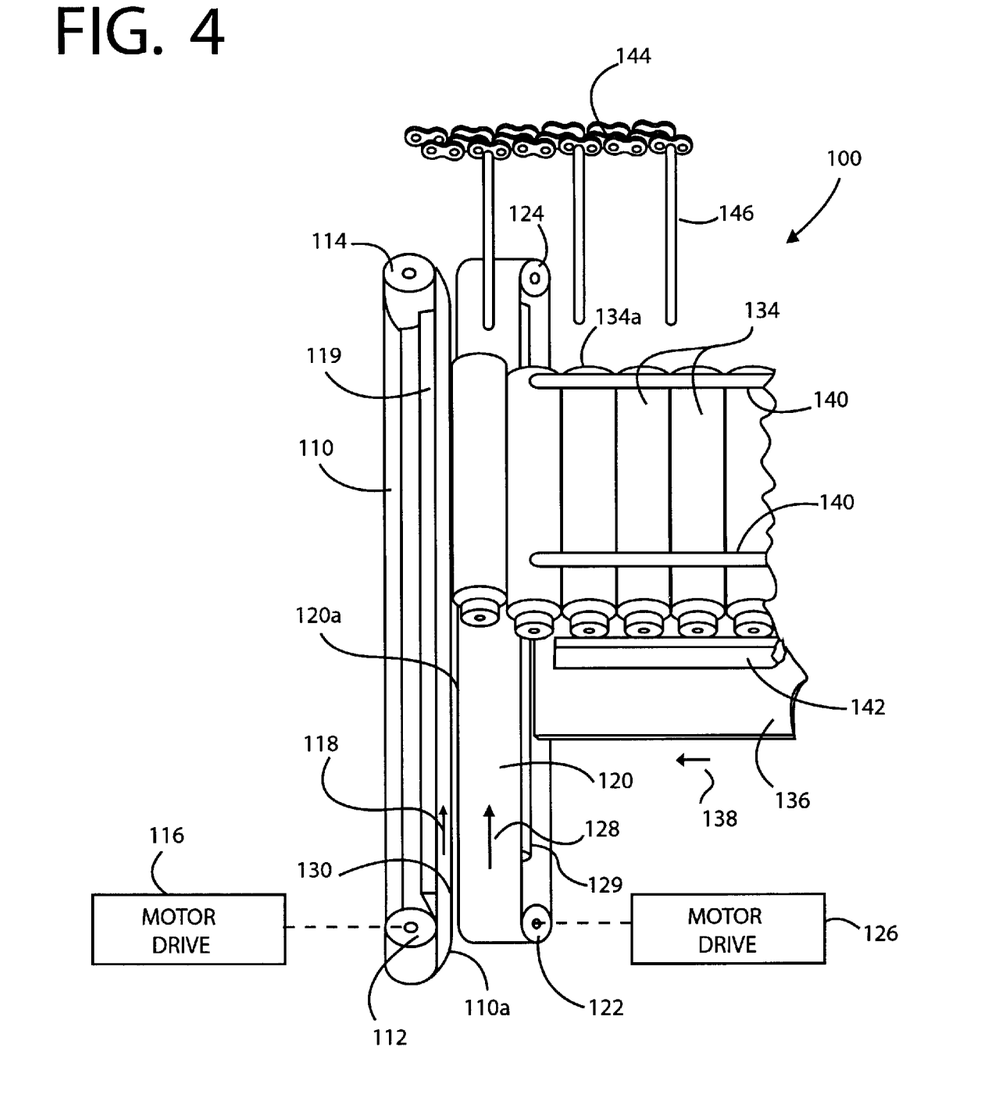
FIG. 4 is a perspective view of a tube loading system according to a first embodiment of the present invention.
Figure 5:
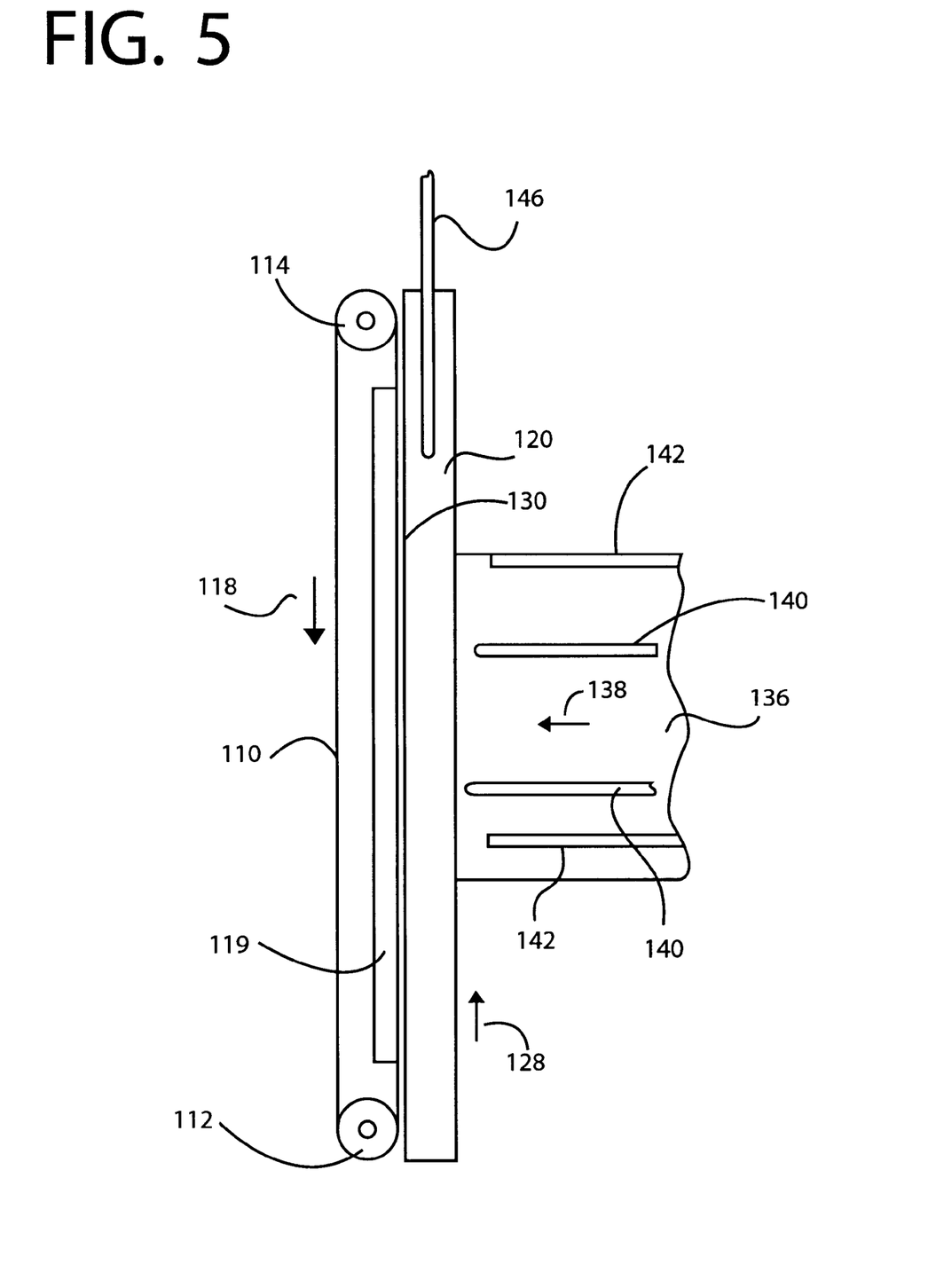
FIG. 5 is a top plan view of the tube loading system of FIG. 4.
Figure 6:
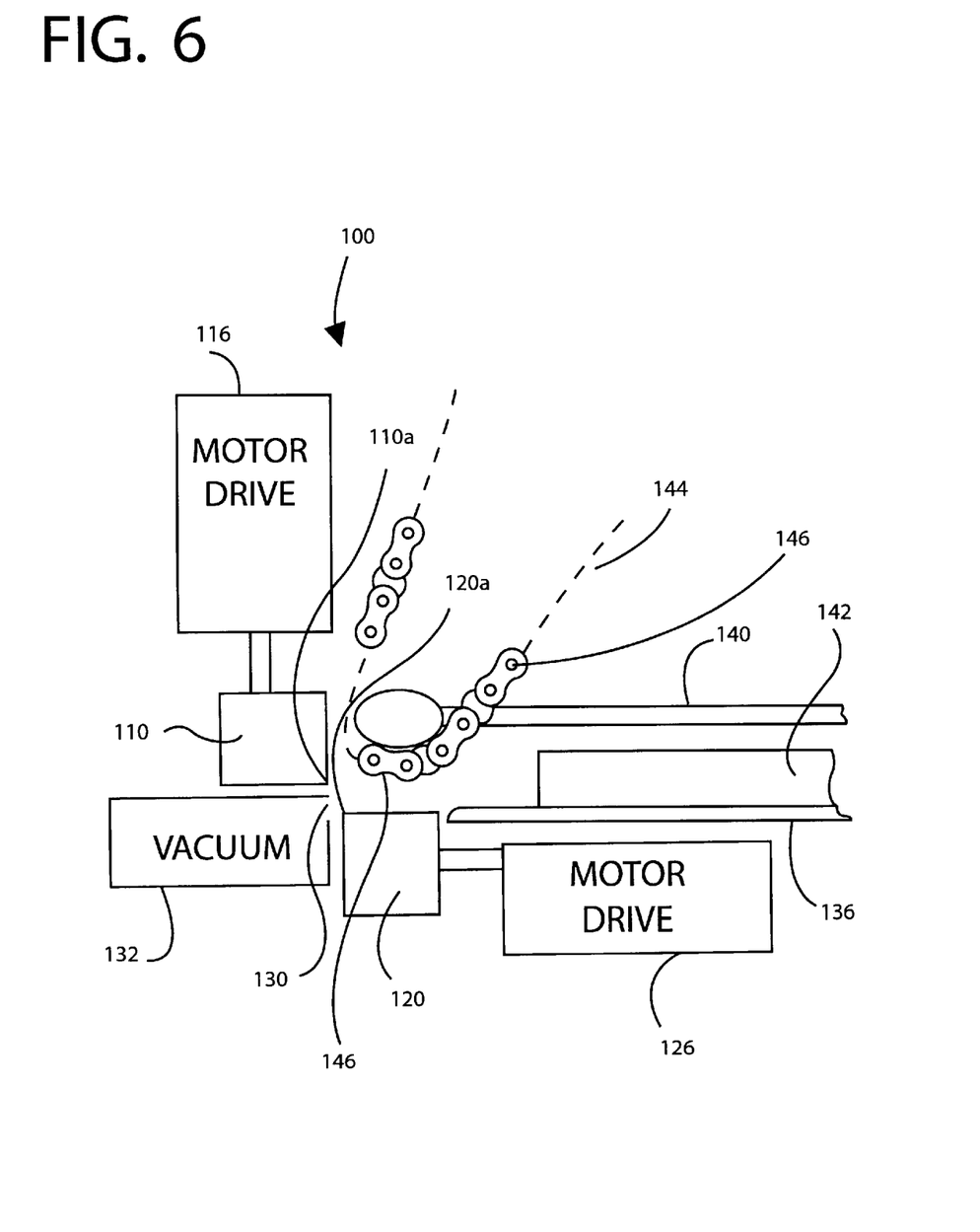
FIG. 6 is a side elevational view of the tube loading system of FIG. 4.

Specifically, as shown in FIGS. 4–6, a tube loading system 100 according to a first embodiment of the present invention includes a first endless flat conveyor belt 110 wrapped about two rollers 112 and 114, with one roller 112 being rotated in an incremental manner by a servo motor 116 in the direction of arrow 118.

A rigid backplate 119 can be positioned behind the front section of conveyor belt 110 as a backing therefor. A second endless flat conveyor belt 120 is also wrapped about two rollers 122 and 124, with one roller 122 being rotated in an incremental manner by a servo motor 126 in the direction of arrow 128. A rigid backplate 129 can be positioned below the upper section of conveyor belt 120 as a backing therefor. Servo motors 116 and 126 can be replaced by a single servo motor that drives both belts 110 and 120.

As shown, conveyor belts 110 and 120 are oriented perpendicular to each other. However, the present invention is not so limited, so that one belt may be oriented at an acute angle or an obtuse angle with respect to the other belt. Further, the lower, front edge 110a of conveyor belt 110 is positioned adjacent the upper, rear edge 120a of conveyor belt 120, with a small elongated gap 130 therebetween, which extends along a length of conveyor belts 110 and 120. A vacuum plenum 132 is connected with a vacuum source and is positioned below conveyor belt 110 and behind conveyor belt 120 so as to apply a vacuum to elongated gap 130.

Thus, a tube 134 positioned on conveyor belts 110 and 120 will be pulled toward gap 130 by vacuum source 132, and is held at a two line contact, that is, along one line against conveyor belt 110 and along another line against conveyor belt 120, so as to provide a stable positioning of the tube 134.

Tubes 134 are stacked, that is, in side to side arrangement, on a ramp 136 along which tubes 134 are moved in the direction of arrow 138, and which terminates very close to the upper, front edge of belt 120. In order to retain tubes 134 on ramp 136, one or more top guide bars 140 and side guide bars 142 are provided. Thus, as tubes 134 are pushed along ramp 136, the leading tube 134 is pushed onto the upper surface of conveyor belt 120, and then held by the vacuum at gap 130 against both conveyor belts 110 and 120.

In addition, a pin chain 144 having a plurality of pins 146 spaced therealong, is continuously moved adjacent to roller 124 and belt 120, or is moved in an indexed manner. Pins 146 extend in a direction substantially parallel to the upper surface of belt 120, such that open ends 134a of tubes 134 can be positioned over pins 146. Appropriate mechanisms can be used for ensuring proper alignment of the pins at positions adjacent vacuum belt 120.

In operation, with belts 110 and 120 stopped, a vacuum is applied by vacuum plenum 132 to gap 130 in order to hold one tube 134 at two line contacts on the outer surfaces of belts 110 and 120. Thereafter, servo motors 116 and 126 incrementally rotate rollers 112 and 122 in synchronism with each other, and thereby belts 110 and 120, a specified distance, which moves the tube 134 thereon onto a pin 146. The tube 134 is held on belts 110 and 120 by the vacuum through gap 130 even when fully deposited on pin 146 to prevent bounce-back of tube 134 off of pin 146. However, the vacuum force at such time is minimal so as not to interfere with pin 146 taking tube 134 away. At this time, after a tube 134 is loaded on pin 146, servo motors 116 and 126 are stopped, the vacuum applied to gap 130 holds the next tube 134 onto belts 110 and 120, and when pin chain 144 moves to an appropriate position such that a new pin 146 approaches the loading position, servo motors 116 and 126 are again operated to deposit the new tube 134 on the next pin 146. Because the open ends of tubes 134 are of a larger diameter than pins 146, even with pin chain 144 moving continuously, tubes 134 will still be deposited on pins 146.

As a result, there is no need for any pocket wheel as in the prior art. This means that there is no need to change any pocket wheel.

It will therefore be appreciated that the present invention is applicable for all sizes of tubes 134 without requiring any change in the apparatus. Further, there is no possibility of deformation of tubes 134 which would result in jamming and shut-down of the apparatus as shown in FIG. 3 of the prior art.

Further, unlike the aforementioned copending application, the tubes 134 are held at two line contacts which are at an angle to each other, namely, along two flat conveyor belts 110 and 120, so that there is no need for a specialized single V-shaped conveyor belt.

Referring now to FIGS. 7–13, a tube loading system 200 according to a second embodiment of the present invention will now be described. Tube loading system 200 is similar to tube loading system 100 by providing a two line contact for the tubes along with a vacuum hold, but the arrangement for the two lines of contact is different.

Figure 7:
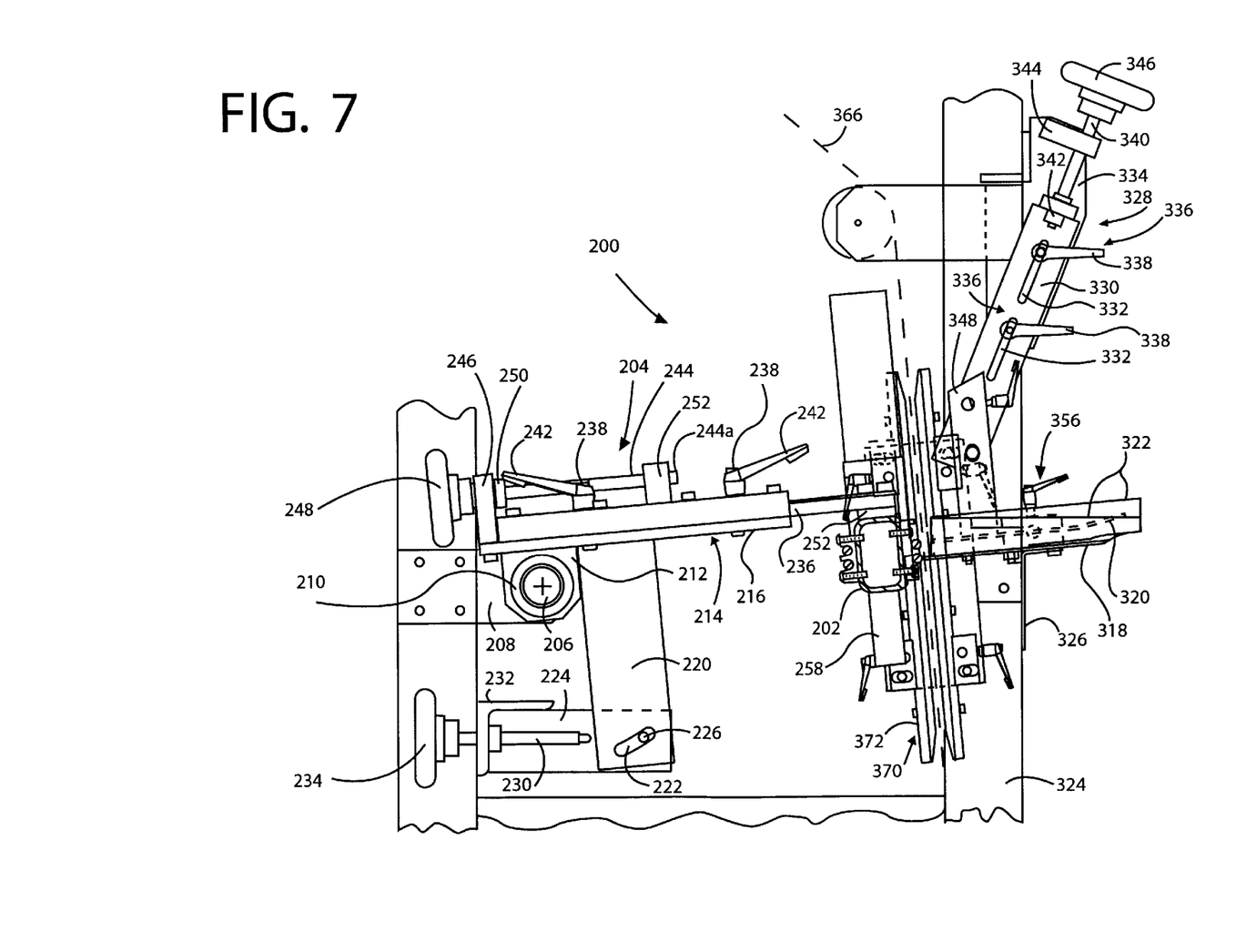
FIG. 7 is a side elevational view, partly in section, of a tube loading system according to a second embodiment of the present invention.
Figure 9:
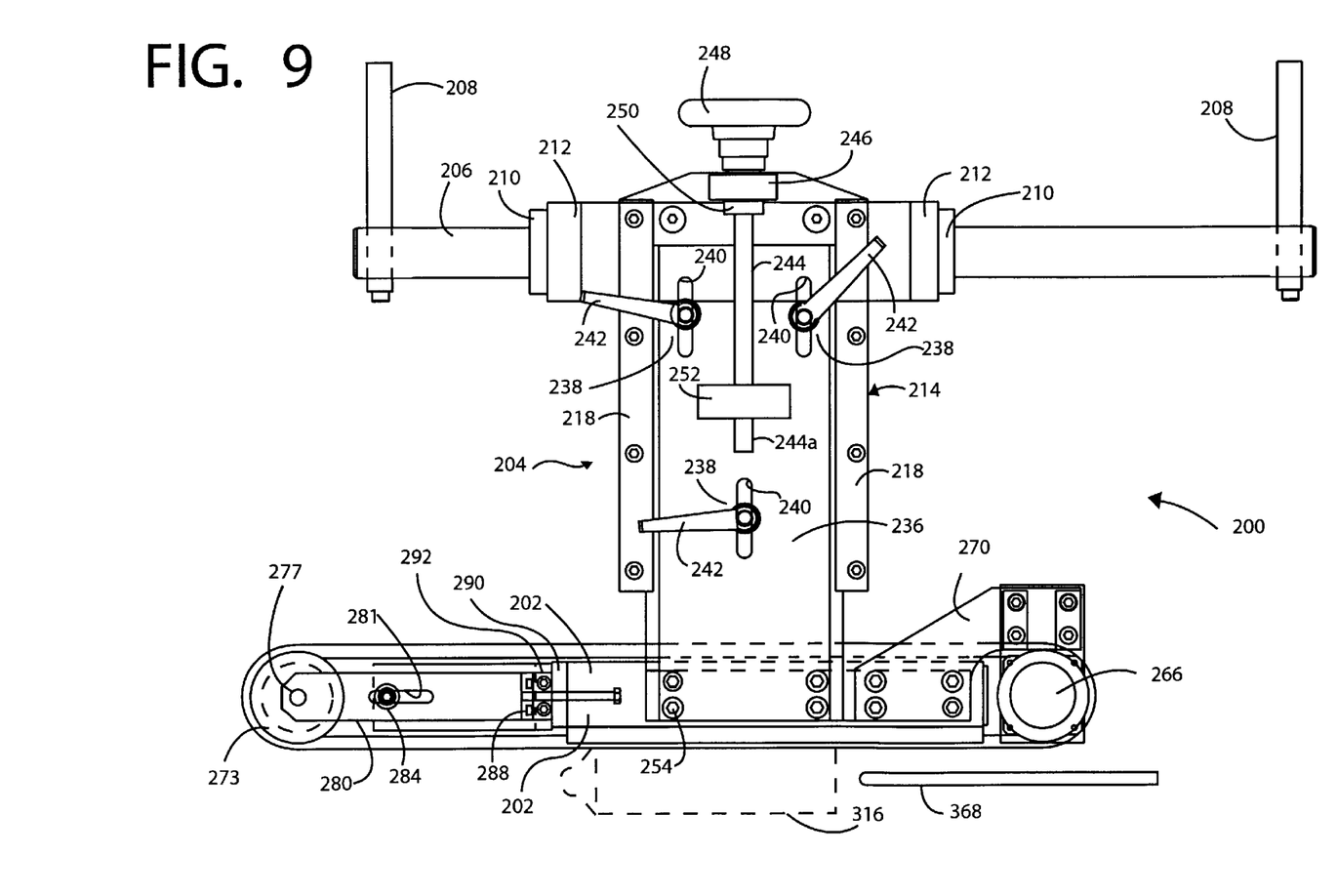
FIG. 9 is a top plan view of a portion of the tube loading system of FIG. 7.

Specifically, tube loading system 200 includes an elongated hollow tube vacuum plenum 202 of a generally rectangular cross-sectional configuration. As shown, vacuum plenum 202 can be angled relative to the vertical by a small amount, for example, 5° so that the front wall 202a thereof is angled rearwardly. However, no angulation is required. The vertical position of vacuum plenum 202 can be varied by a vertical adjustment assembly 204 which is best shown in FIGS. 7 and 9, to align the belts with the center line of the tubes.

Specifically, vertical adjustment assembly 204 includes a support shaft 206 fixed to machine frame members 208. A U-shaped pivot bracket 212 is rotatably mounted on support shaft 206, and has clamping collars 210 mounted adjacent opposite ends thereof. A support assembly 214 has a bottom plate 216 fixed to upper ends of pivot bracket 212, and opposite L-shaped side gibs 218 fixed to opposite sides of support assembly 214.

A lower angle adjusting plate 220 extends down from bottom plate 216 and has an elongated arcuate slot 222 at the lower end thereof. A lower machine frame wall 224 extends adjacent the lower end of lower angle adjusting plate 220 and has a clamping screw 226 that extends through slot 222, to lock vertical adjustment assembly 204 in a desired vertical position. In addition, a threaded shaft 230 extends through a threaded opening in a fixed L-shaped bracket 232, with the free end thereof adjacent the lower end of lower angle adjusting plate 220. A handle 234 is mounted to the opposite end of threaded shaft 230 to rotate the same, and thereby adjust the position of the free end of threaded shaft 230, to adjust the vertical position of vertical adjustment assembly 204.

A slide plate 236 is slidably mounted within support assembly 214 for forward and rearward movement, and specifically, is guided by side gibs 218 and slidably rests on bottom plate 216 thereof. Slide plate 236 can be fixed at any position relative to bottom plate 216 by means of tightening bolt assemblies 238 that extend upwardly from bottom plate 216 and through elongated slots 240 in slide plate 236. Handles 242 of tightening bolt assemblies 238 are provided for tightening bolt assemblies 238, and thereby movably securing slide plate 236 to bottom plate 216 at a desired position.

In order to move slide plate 236 within support assembly 214 when tightening bolt assemblies 238 are loosened, a shaft 244 rotatably extends through an opening in a fixed bracket 246 secured to bottom plate 216, and is held therein by a rotatable handle 248 on one side of bracket 246 and a locking washer 250 on the opposite side of bracket 246. Thus, shaft 244 can rotate within bracket 246, but cannot move axially relative thereto. The free end 244a of shaft 244 is threaded and threadedly engages in a threaded opening in a bracket 252 mounted to the upper surface of slide plate 236. Thus, as shaft 244 is rotated, slide plate 236 is moved in the axial direction of shaft 244.

The forward end (bottom end in FIG. 9) of slide plate 236 is fixed to a mounting pad 252 welded to the upper surface of vacuum plenum 202, by bolts 254. Thus, with this arrangement, when slide plate 236 is fixed relative to support assembly 214, handle 234 can be rotated, thereby changing the vertical position of vacuum plenum 202.

Vacuum plenum 202 further includes a lower elongated opening 256 in the bottom wall thereof, and which is connected with a vacuum hose adapter 258 for connection to a vacuum source. Vacuum hose adapter 258 is omitted in FIG. 11 for better viewing of opening 256. In this manner, a vacuum can be applied to the interior chamber of vacuum plenum 202. Vacuum plenum 202 further includes a lengthwise extending vacuum slot 260 centrally in front wall 202a thereof. As will be explained hereinafter, a tube is held by the vacuum applied through vacuum slot 260, for transport to a pin of a pin chain.

Figure 10:
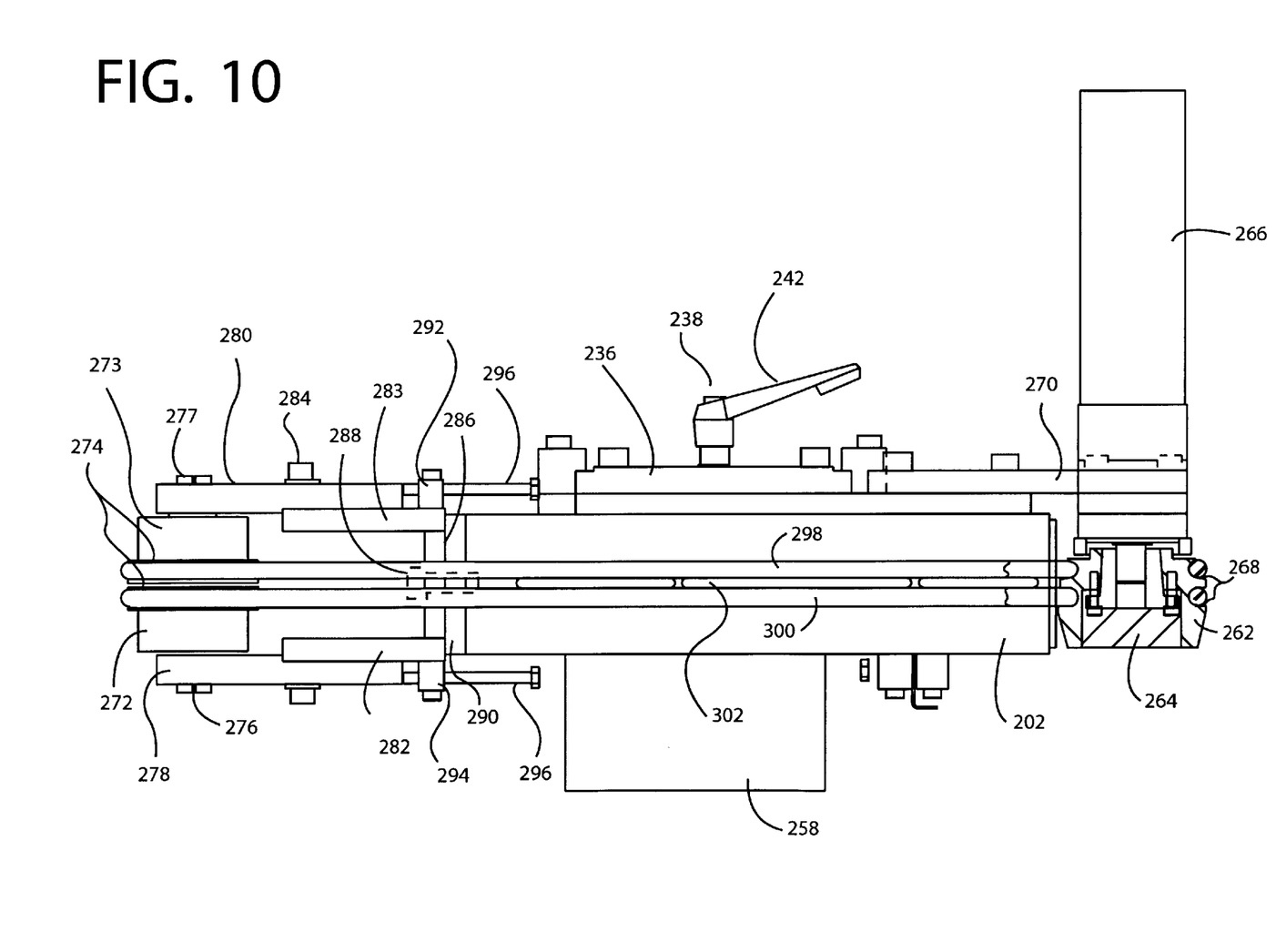
FIG. 10 is a front elevational view of a portion of the tube loading system of FIG. 7, showing the drive assembly partly in section.

A first pulley 262 is mounted on a split taper bushing 264 at one end of vacuum plenum 202. Pulley 262 includes two axially spaced, annular grooves 268 therearound. Split taper bushing 264 is rotated by a drive motor 266 connected therewith. Drive motor 266, in turn, is supported by a plate 270 that is secured to the upper wall of vacuum plenum 202.

Figure 11:
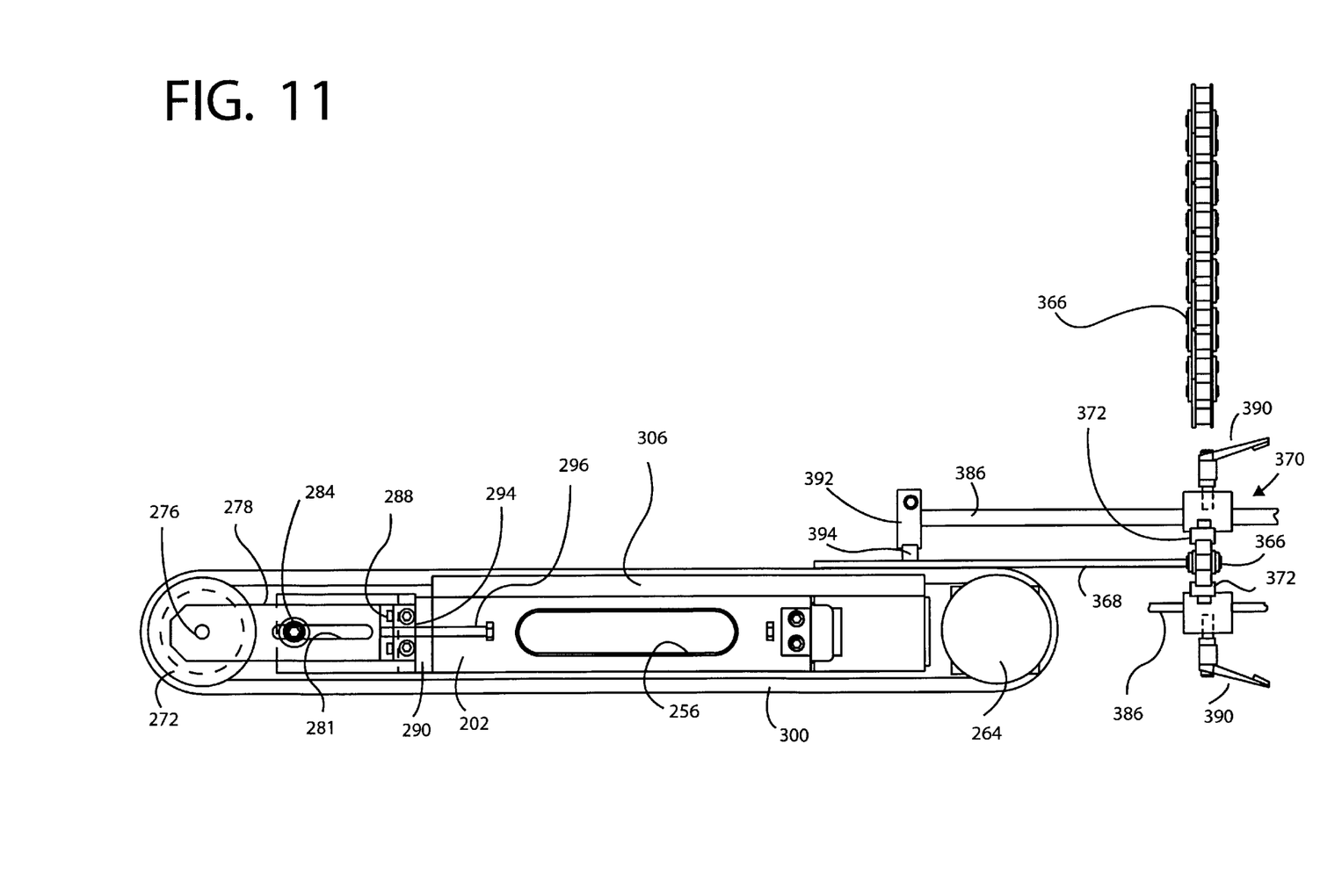
FIG. 11 is a bottom plan view of a portion of the tube loading system of FIG. 7.

Second and third pulleys 272 and 273 each have an annular groove 274 therearound, and are mounted at the opposite end of vacuum plenum 202. Specifically, second and third pulleys 272 and 273 are rotatably mounted via bearings (not shown) on shafts 276 and 277 that are secured to one end of lower and upper support plates 278 and 280, respectively, with plates 278 and 280 extending in the lengthwise direction of vacuum plenum 202, as best shown in FIGS. 9–11. Each plate 278 and 280 includes an elongated slot 281 therein, and is positioned on lower and upper surfaces of inner plates 282 and 283, respectively. Positioning bolts 284 extend through elongated slots 281 into threaded openings in the upper and lower surfaces of inner plates 282 and 283. Accordingly, plates 278 and 280 can be adjusted in the left and right directions of FIG. 11, that is, away from and toward vacuum plenum 202.

The opposite ends of inner plates 282 and 284 are secured together by a connecting plate 286, which in turn, is connected by bolts 288 to an end plate 290 mounted to the end of vacuum plenum 202. In this manner, the distance of second and third pulleys 272 and 273 from vacuum plenum 202 can be independently adjusted to tension the belts discussed hereinafter.

In addition, upper and lower tension blocks 292 and 294 are mounted to the upper and lower surfaces at the inner ends of inner plates 283 and 282, respectively. Tension blocks 292 and 294 have threaded openings through which adjusting screws 296 extend. The free ends of adjusting screws 296 can be used as stops to positively adjust the distance of second and third pulleys 272 and 273 from vacuum plenum 202.

Figure 14:
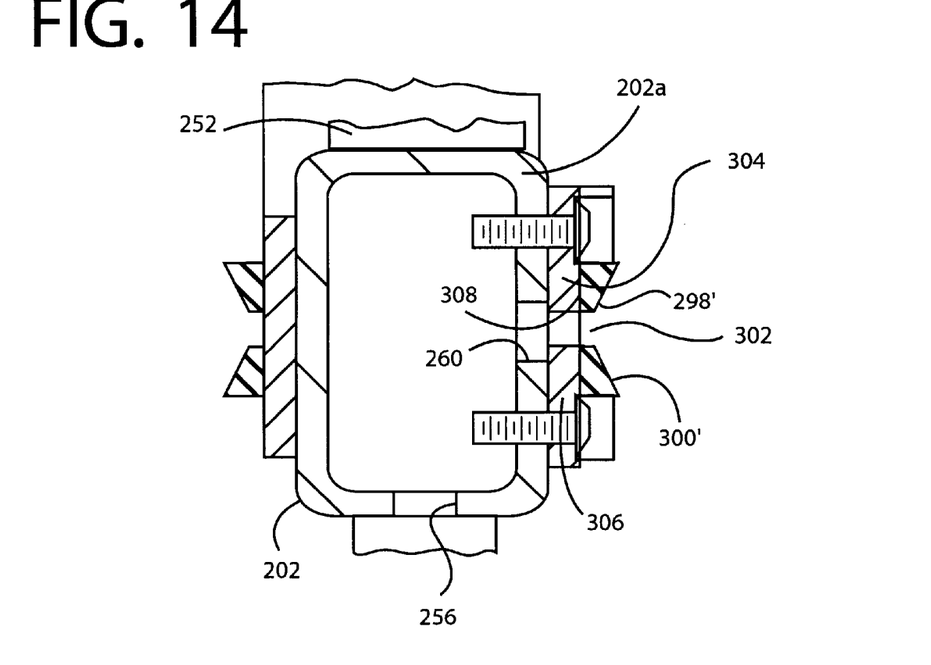
FIG. 14 is a cross-sectional view of endless belts according to another embodiment of the present invention.

First and second endless belts 298 and 300 extend around pulleys 262 and 273, and pulleys 262 and 272, respectively, and thereby, extend around vacuum plenum 202. Endless belts 298 and 300 are round belts, shown to have a circular cross-sectional configuration. However, the present invention is not so limited. Thus, endless belts 298 and 300 can have any other suitable configuration, such as shown by the endless belts 298' and 300' having a trapezoidal cross-sectional configuration in FIG. 14.

Figure 8:
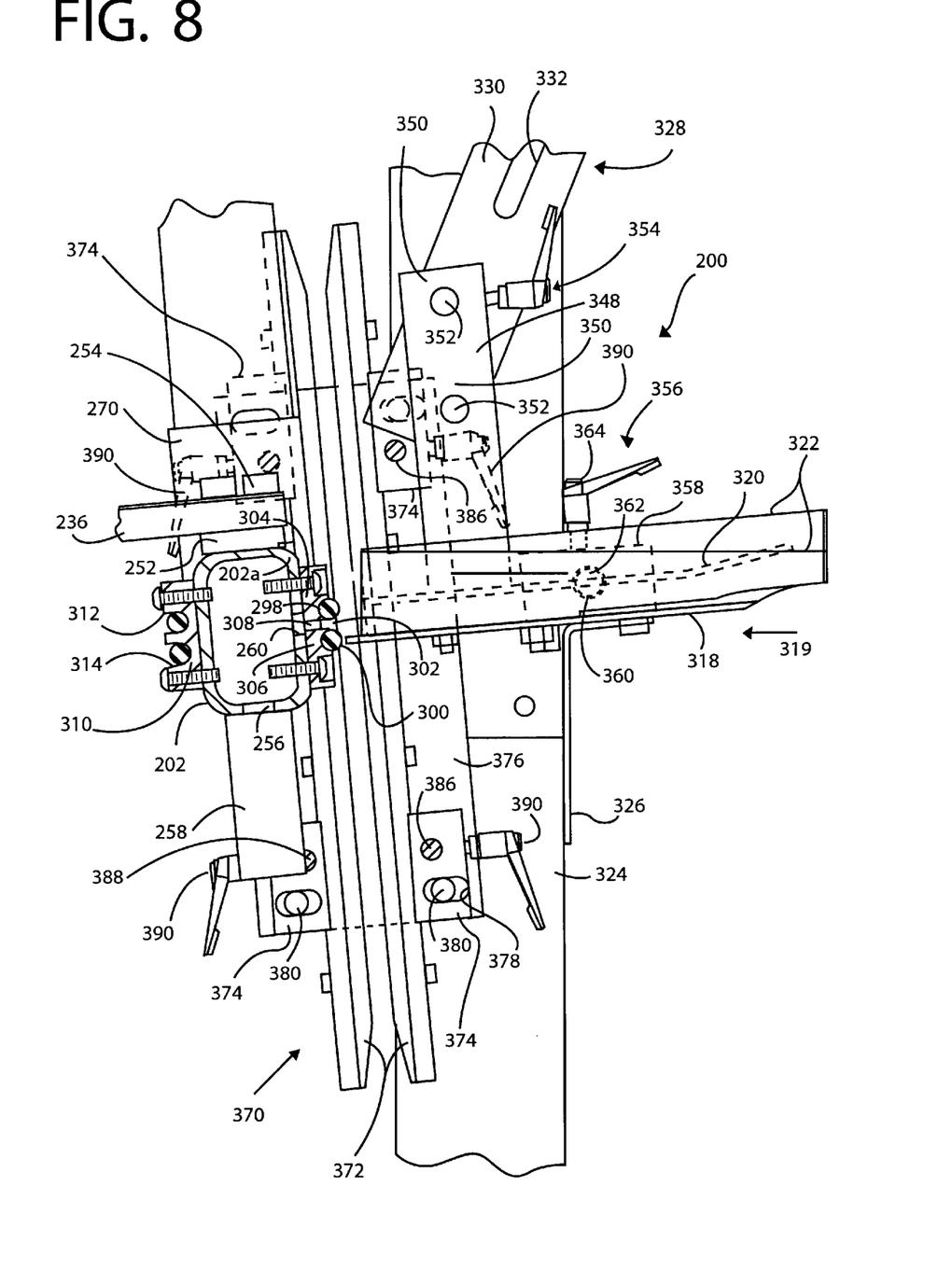
FIG. 8 is an enlarged side elevational view, partly in section, of a portion of the tube loading system of FIG. 7.

Endless belts 298 and 300 are spaced from each other in the vertical direction so as to provide a lengthwise extending gap 302 therebetween, with gap 302 being in alignment with elongated vacuum slot 260. Front belt guides 304 and 306 are secured to the front wall of vacuum plenum 202, between endless belts 298 and 300, respectively, and the front wall of vacuum plenum 202. An elongated gap 308 is formed between front belt guides 304 and 306 in alignment with vacuum slot 260 and gap 302. As will be appreciated from the discussion hereinafter, a tube is pulled and held against endless belts 298 and 300 by the vacuum pressure, whereby a two line contact is provided for holding the tubes.

In addition, a single belt guide 310 can be secured to the rear wall of vacuum plenum 202, and has two elongated recesses 312 and 314 for guiding endless belts 298 and 300.

With this arrangement, tubes 316 are stacked, that is, in side to side arrangement, on a ramp 318 on which tubes 316 are moved in the direction of arrow 319, and which terminates very close to the lower endless belt 300 at the front side of vacuum plenum 202. Ramp 318 is held to a frame member 324 by an L-shaped bracket 326. In order to retain tubes 316 on ramp 318, one or more top guide bars 320 and side guide bars 322 are provided.

A top guide bar adjustment assembly 328 includes a first adjustment plate 330 having two elongated slots 332 therein. Adjustment plate 330 can be fixed at different positions to a bracket 334 fixed to frame member 324 by means of tightening bolt assemblies 336 that extend from bracket 334 and through elongated slots 332 in adjustment plate 330. Handles 338 of tightening bolt assemblies 336 are provided for tightening bolt assemblies 336, and thereby, for removably securing adjustment plate 330 to bracket 334 at a desired position. It will be appreciated that adjustment plate 330 is oriented at an angle to the vertical. This is so that, as top guide bars 320 are raised to accommodate larger tubes 316, they are also moved away from vacuum plenum 202 to account for the larger diameters of the tubes.

In order to move adjustment plate 330 relative to bracket 334 when tightening bolt assemblies 336 are loosened, a shaft 340 has one end rotatably connected with a split collar 342 secured to the upper end of adjustment plate 330. Thus, shaft 340 can rotate within split collar 342, but cannot move axially relative thereto. The opposite end of shaft 340 is threaded and extends through a threaded opening in a fixed bracket 344 secured to bracket 334, and has a handle 346 secured thereto. Thus, as shaft 340 is rotated, adjustment plate 330 is moved in its lengthwise direction, and can be secured at a desired position by tightening bolt assemblies 336.

A second adjustment plate 348 is secured to first adjustment plate 330. Specifically, second adjustment plate 348 is vertically oriented, and therefore, oriented at an angle to first adjustment plate 330. Second adjustment plate 348 includes two holes 350 which receive pins 352 extending from first adjustment plate 330 so that second adjustment plate 348 is held to first adjustment plate 330. A tightening bolt assembly 354 is fixed to second adjustment plate 348 for engaging one of the pins 352 and thereby fixing second adjustment plate 348 to first adjustment plate 330 at a desired position.

The lower end of second adjustment plate 348 is secured to top guide bars 320. Accordingly, when first adjustment plate 330 is moved along elongated slots 332, top guide bars 320 are caused to move downwardly and toward vacuum plenum 202, or upwardly and away from vacuum plenum 202, to accommodate different diameter tubes 316.

A side guide bar adjustment assembly 356 is provided for adjusting the position of one side guide bar 322 on ramp 318. In this regard, a block 358 is fixed to frame member 324 and has a transverse bore 360. A guide shaft 362 extends through bore 360 and is connected with the respective side guide bar 322 to enable the side guide bar 322 to move in a direction to accommodate larger or smaller length tubes 316. A tightening bolt assembly 364 is mounted to block 358 for engaging guide shaft 362, thereby releasably locking the respective side guide bar 322 in a desired transverse position.

As tubes 316 are pushed along ramp 318, the leading tube 316 is pushed against endless belts 298 and 300, and then held by the vacuum at gap 302 against both endless belts 298 and 300 with a two line contact. Because of the circular cross-sectional configuration of endless belts 298 and 300, any diameter tube 316 can be held thereagainst.

In addition, a pin chain 366 having a plurality of pins 368 spaced therealong, is continuously moved adjacent to drive motor 266 and conveyor belts 298 and 300, or moved in an indexed manner. Pins 368 extend in a direction substantially parallel to and in front of conveyor belts 298 and 300, such that open ends of tubes 316 can be positioned over pins 368.

Figure 12:
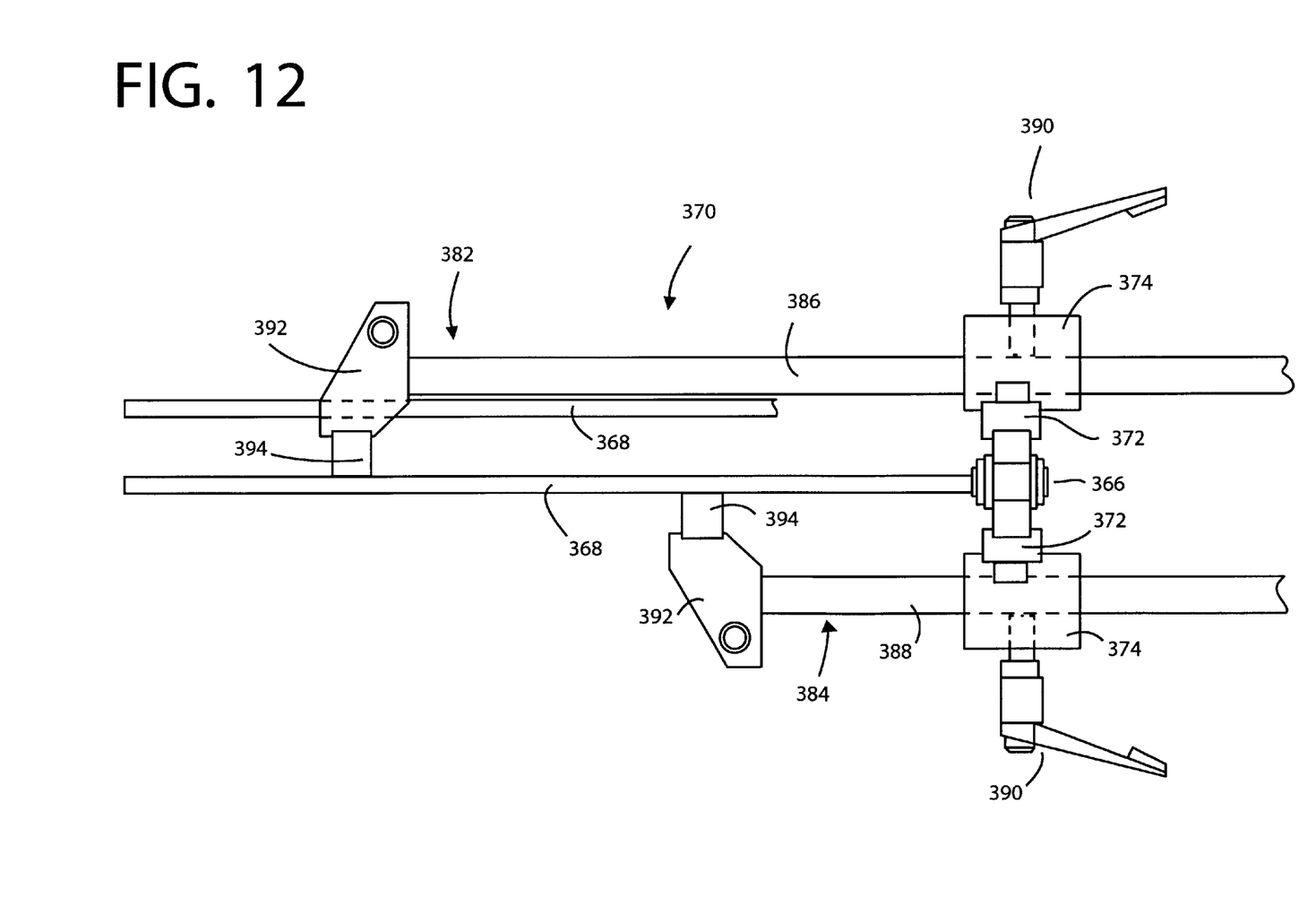
FIG. 12 is top plan view of the chain and pin guiding system.
Figure 13:
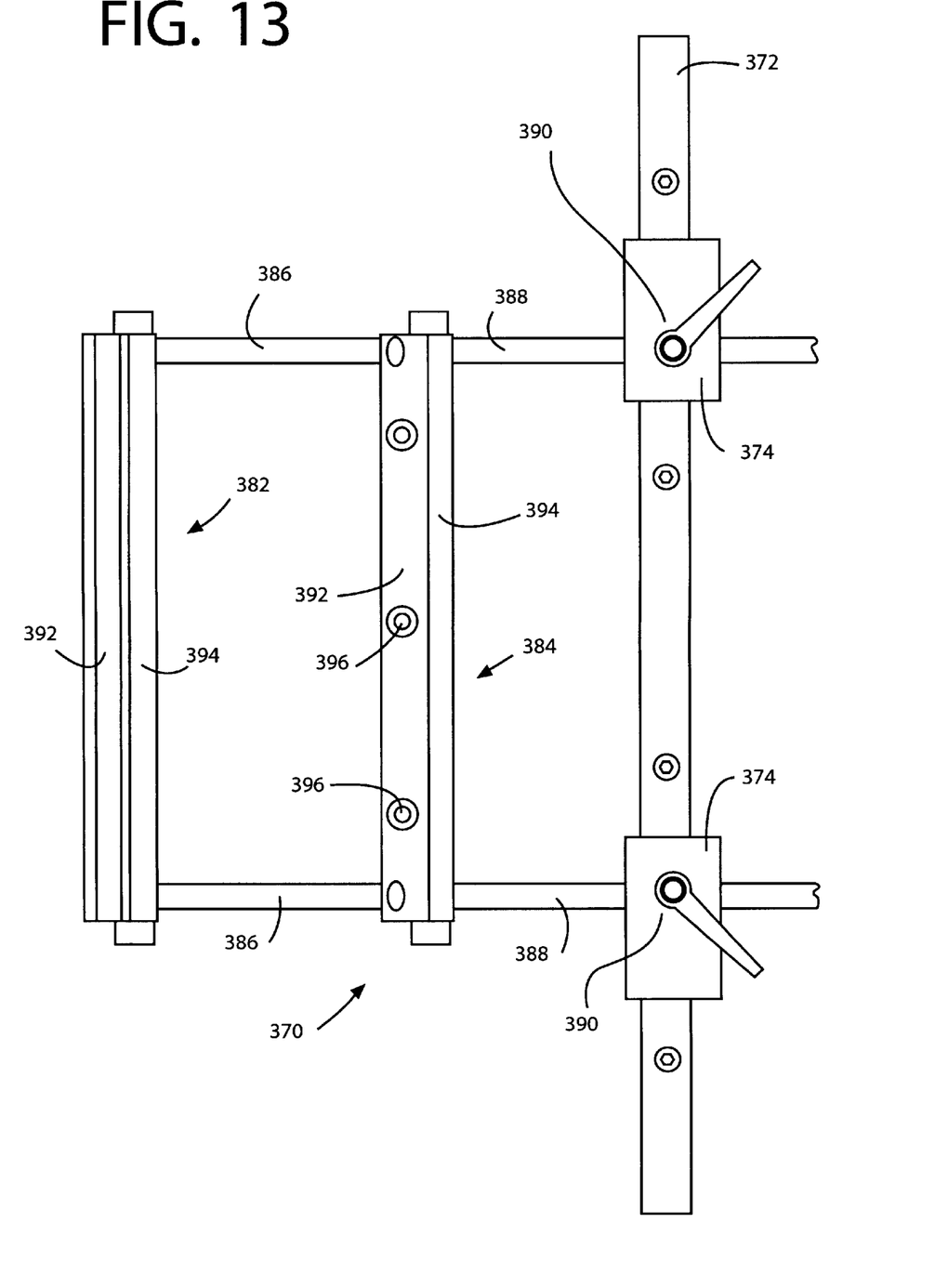
FIG. 13 is a side elevational view of the chain and pin guiding system.

A pin alignment mechanism 370 is provided for ensuring proper alignment of pins 368 at positions adjacent conveyor belts 298 and 300. Specifically, two spaced apart chain guide bars 372 are arranged to guide the pin chain 366. Each chain guide bar 372 has two vertically spaced apart pin guide blocks 374 fixed thereto, with pin guide blocks 374 adjustably mounted to a frame plate 376. In this regard, each pin guide block 374 has an oblong bore 378 extending therethrough for receiving a clamping bolt 380 extending from frame plate 376, with an appropriate tightening mechanism (not shown) being provided for locking clamping bolts 380 at appropriate positions in oblong bore 378. In this manner, by adjusting the positions of clamping bolts 380 in oblong bores 378, chain guide bars 372 can be moved toward and away from each other for adjustment. This assures that pin chain 366 will follow a desired course as shown in FIG. 7.

In addition, different links of pin chain 366 have pins 368 extending therefrom to a position in front of conveyor belts 298 and 300, as discussed above. In order to prevent wobbling of pins 368, left and right pin guides 382 and 384 are adjustably mounted in pin guide blocks 374 for engaging on opposite sides of each pin 368 and guiding each pin 368 to prevent wobbling thereof. Specifically, each pin guide 382 and 384 includes a first rod 386 slidably mounted in a pin guide block 374 associated with one chain guide bar 372 and a second rod 388 slidably mounted in another pin guide block 374 associated with the same chain guide bar 372, that is, on the same side of the pins 368. Rods 386 and 388 can be locked in different extended positions by tightening bolt assemblies 390. A pin guide block 392 is fixed between the free ends of rods 388, with pin guide block 392 having an anti-friction pin guide 394 held by bolts 396 thereto. In like manner, a pin guide block 392 is fixed between the free ends of rods 386, with this pin guide block 392 having an anti-friction pin guide 394 held by bolts 396 thereto. In this manner, as best shown in FIG. 12, a pin 368 is guided between two anti-friction pin guides 394 on opposite sides thereof.

In operation, with belts 298 and 300 stopped, a vacuum is applied by vacuum plenum 202 to gap 302 in order to hold one tube 316 at two line contacts on the outer surfaces of belts 298 and 300. Thereafter, drive motor 266 incrementally rotates first pulley 262, and thereby belts 298 and 300, a specified distance, which moves the tube 316 thereon onto a pin 368 which has been moved to the appropriate position. The tube 316 is held on belts 298 and 300 by the vacuum through gap 302 even when fully deposited on pin 316 to prevent bounce-back of the tube 316 of f of pin 368. However, the vacuum force at such time is minimal so as not to interfere with pin 368 taking tube 316 away. At this time, after a tube 316 is loaded on pin 368, drive motor 266 is stopped, the vacuum applied to gap 302 holds the next tube 316 onto belts 298 and 300, and when pin chain 366 moves to an appropriate position such that a new pin 368 approaches the loading position, drive motor 266 is again operated to deposit the new tube 316 on the next pin 368. Because the open ends of tubes 316 are of a larger diameter than pins 368, even with pin chain 366 moving continuously, tubes 316 will still be deposited on pins 368.

Figure 15:
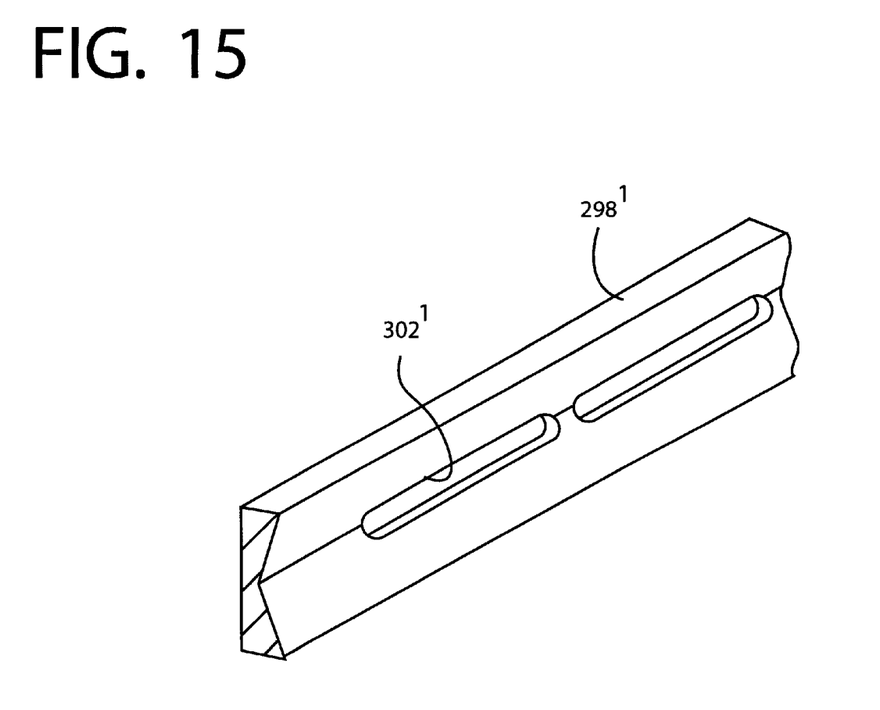
FIG. 15 is a cross-sectional view of an endless belt according to another embodiment of the present invention.

It will be appreciated that various modifications can be made to the present invention, within the scope of the claims herein. Thus, an important aspect of the present invention is the use of a two line contact for each tube, held thereto by a vacuum. In the first embodiment, this is accomplished by two mutually perpendicular flat conveyor belts with a vacuum applied to a gap at a corner meeting area. In the second embodiment, this occurs by two round conveyor belts of circular cross-sections, with a lengthwise gap therebetween at which the vacuum is applied. However, other variations can be provided. For example, a single V-shaped belt 298' can be provided with a lengthwise extending gap 302', as shown in FIG. 15, so as to effectively provide an arrangement similar to the embodiment of FIG. 14 of the present invention. Thus, there is no requirement for two distinct conveyor belts, but rather, only for a two line contact with each tube, with a vacuum that holds the tube between the two line contact.

Although the present invention has been discussed in relation to tubes, it is not limited thereto and can be used with any other suitable article, such as sleeves or the like. Thus, in the claims, reference to tubes is intended to cover all similar structures, such as sleeves or other cylindrical articles.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. A tube loading system comprising:
   at least one conveyor belt for holding a tube having an open end thereagainst with two lines of contact;
   a motor drive for moving said at least one conveyor belt;
   a gap between said two lines of contact;
   a vacuum source for supplying a vacuum to said gap so as to pull said tube against said at least one conveyor belt in engagement with said two lines of contact;
   a pin chain having a plurality of pins spaced therealong for receiving the open ends of the tubes thereon, said pins being positioned adjacent said at least one conveyor belt; and
   a delivery device for supplying said tubes in sequence to said at least one conveyor belt such that each tube is held in engagement against said at least one conveyor belt with said two lines of contact by said vacuum at said gap, and as said belt moves, each said tube is deposited on a respective pin of said pin chain.

2. A tube loading system according to claim 1, wherein said at least one conveyor belt includes at least one endless belt wrapped about two pulleys, with said gap extending lengthwise therealong between said two lines of contact.

3. A tube loading system according to claim 2, wherein said at least one endless belt includes two parallel, spaced apart conveyor belts with said gap therebetween.

4. A tube loading system according to claim 3, wherein said two conveyor belts are oriented at an angle relative to each other.

5. A tube loading system according to claim 4, wherein said two conveyor belts are substantially perpendicular to each other, with adjacent edges separated by said gap.

6. A tube loading system according to claim 3, wherein each said conveyor belt has a substantially circular cross-sectional configuration.

7. A tube loading system according to claim 3, wherein each said conveyor belt has a substantially trapezoidal cross-sectional configuration.

8. A tube loading system according to claim 2, wherein there is a single conveyor belt having a substantially V-shaped cross-sectional configuration, with said gap extending lengthwise along said belt at a center of said V-shape.

9. A tube loading system according to claim 1, wherein said vacuum source includes a vacuum plenum against which said at least one conveyor belt rides, said vacuum plenum including an opening in alignment with said gap for applying the vacuum through said opening to said gap.

10. A tube loading system according to claim 9, further including a vertical adjusting assembly for adjusting a vertical position of said vacuum plenum and thereby a vertical position of said at least one conveyor belt.

11. A tube loading system according to claim 2, wherein said motor drive includes a motor for rotating at least one of said pulleys.

12. A tube loading system according to claim 11, wherein said motor includes a servo motor that incrementally rotates said at least one pulley.

13. A tube loading system according to claim 1, wherein said vacuum source includes a vacuum plenum positioned behind said at least one conveyor belt at said gap, for applying a vacuum to said gap.

14. A tube loading system according to claim 1, wherein said pins extend in a direction substantially parallel to said at least one conveyor belt such that the open ends of said tubes are positioned over said pins.

15. A tube loading system according to claim 1, further comprising a pin alignment mechanism for guiding said pins to a position adjacent to and substantially parallel with said at least one conveyor belt.

16. A tube loading system according to claim 14, wherein said pin alignment mechanism includes at least one chain guide assembly for guiding said pin chain along a predetermined path.

17. A tube loading system according to claim 16, wherein said pin alignment mechanism further includes at least one pin guide assembly for engaging free portions of said pins to provide a predetermined alignment of said pins as said pins pass by said at least one conveyor belt.

* * * * *